United States Patent
Marchandise et al.

(10) Patent No.: US 10,662,930 B2
(45) Date of Patent: May 26, 2020

(54) HALL-EFFECT THRUSTER USABLE AT HIGH ALTITUDE

(71) Applicant: Safran Aircraft Engines, Paris (FR)

(72) Inventors: Frédéric Raphaël Jean Marchandise, Vernon (FR); Stéphan Zurbach, Vernon (FR)

(73) Assignee: Safran Aircraft Engines, Paris (FR)

( * ) Notice: Subject to any disclaimer, the term of this patent is extended or adjusted under 35 U.S.C. 154(b) by 319 days.

(21) Appl. No.: 15/742,288

(22) PCT Filed: Jul. 6, 2016

(86) PCT No.: PCT/FR2016/051715
§ 371 (c)(1),
(2) Date: Jan. 5, 2018

(87) PCT Pub. No.: WO2017/006056
PCT Pub. Date: Jan. 12, 2017

(65) Prior Publication Data
US 2018/0216606 A1    Aug. 2, 2018

(30) Foreign Application Priority Data

Jul. 8, 2015 (FR) ...................... 15 56477

(51) Int. Cl.
*F03H 1/00* (2006.01)
*B64G 1/40* (2006.01)
(52) U.S. Cl.
CPC ........... *F03H 1/0075* (2013.01); *B64G 1/405* (2013.01); *F03H 1/0012* (2013.01)

(58) Field of Classification Search
CPC ........ F03H 1/00; F03H 1/0006; F03H 1/0062; F03H 1/0068; F03H 1/0075;
(Continued)

(56) References Cited

U.S. PATENT DOCUMENTS 6,145,298 A * 11/2000 Burton, Jr. ............ F03H 1/0012
313/359.1
2003/0046921 A1 * 3/2003 Hruby ................... F03H 1/0012
60/202

(Continued)

OTHER PUBLICATIONS

International Search Report and Written Opinion with English translation dated Oct. 21, 2016 in corresponding International Application No. PCT/FR2016/051715 (14 pages).
(Continued)

*Primary Examiner* — Gerald L Sung
*Assistant Examiner* — William L Breazeal
(74) *Attorney, Agent, or Firm* — Bookoff McAndrews, PLLC (57) ABSTRACT

A Hall-effect thruster (10), configured to be arranged inside or outside a spacecraft.
The thruster has a concentrator (36) for collecting particles (P).
The shape of the concentrator is defined by a continuous contour (C1) wrapped around the thrust axis and is such that on a major portion of the contour, each section of the concentrator perpendicular to the contour has a parabolic shape and has a focus (F1) belonging to the contour (C1). In addition, the magnetic circuit (50) is arranged so as to generate the magnetic field (B) in the vicinity of the contour (C1).

15 Claims, 4 Drawing Sheets

(58) Field of Classification Search
CPC ...... F03H 1/0037; F03H 1/0043; F03H 1/005; F03H 1/0056; F03H 1/0081; F03H 1/0087; F03H 1/0093; B64G 1/405; B64G 1/406
See application file for complete search history.

(56) References Cited

U.S. PATENT DOCUMENTS

| | | | |
|---|---|---|---|
| 2005/0178919 A1* | 8/2005 | Dressler | B64G 1/405 244/171.1 |
| 2008/0116808 A1 | 5/2008 | McClure et al. | |
| 2015/0210406 A1* | 7/2015 | Yi | F02K 99/00 60/203.1 |

OTHER PUBLICATIONS

McGuire, Thomas John, "Aero-Assisted Orbital Transfer Vehicles Utilizing Atmosphere Ingestion," Submitted to Department of Aeronautics and Astronautics at Massachusetts Institute of Technology, Jun. 2001 (133 pages), http://ssl.mit.edu/files/website/theses/SM-2001-McGuireThomas.pdf.

Romano, Francesco, et al., "Air-Intake Design Investigation for an Air-Breathing Electric Propulsion System," Joint Conference of $30^{th}$ ISTS, $34^{th}$ IEPC and $6^{th}$ NSAT, Hyugo-Kobe, Japan, Jul. 4-10, 2015 (28 pages), https://www.researchgate.net/publication/279975953.

* cited by examiner

HALL-EFFECT THRUSTER USABLE AT HIGH ALTITUDE

CROSS-REFERENCE TO RELATED APPLICATIONS

This application is the U.S. national phase entry under 35 U.S.C. § 371 of International Application No. PCT/FR2016/051715, filed on Jul. 6, 2016, which claims priority to French Patent Application No. 1556477, filed on Jul. 8, 2015, the entireties of which are herein incorporated by reference.

FIELD OF THE INVENTION

The present invention relates to the field of Hall-effect thrusters with atmospheric gas as propellant.

TECHNICAL BACKGROUND

Document US2003/046921 describes a Hall-effect thruster with atmospheric gas as propellant. Such a thruster uses particles of the residual atmosphere in which it maneuvers to operate.

Hall-effect thrusters with atmospheric gas as the propellant are mainly used to propel observation satellites; these thrusters are particularly useful in low orbit.

At this altitude, the residual atmosphere slows the satellites, which limits their lifetime. Advantageously, Hall-effect thrusters with atmospheric gas as the propellant allow this drag to be compensated, which thus increases the lifetime of the satellites.

However, taking into account the atmospheric rarefaction with altitude, these thrusters cannot operate above an altitude near 100 km. They are therefore not usable at altitudes higher than this, such as for example to allow the transfer of satellites toward higher orbits.

Moreover, document US2008/116808 describes a plasma thruster technology which can be implemented on an outer wall.

PRESENTATION OF THE INVENTION

The aim of the invention is therefore to propose a Hall-effect thruster with atmospheric gas as the propellant capable of operating at a higher altitude than traditional Hall-effect thrusters.

A first aspect of the invention relates primarily to Hall-effect thrusters comprising an (inner) channel for accelerating the particles.

According to this first aspect of the invention, the objective previously indicated is attained by means of a Hall-effect thruster for developing thrust along a thrust axis, the thruster comprising:

a channel allowing collection, acceleration and ejection of particles by the thruster when it is in operation, the channel being delimited radially by an inner wall and an outer wall;

an electrical circuit comprising an anode, a cathode, and an electrical voltage source to emit electrons via the cathode and to attract electrons via the anode;

a magnetic circuit for generating a magnetic field in the channel axially downstream of the anode, the magnetic field being directed in a substantially radial direction with respect to the thrust axis;

the thruster being characterized in that the channel is open on an upstream side of the thruster and including a particle concentrator for collecting particles;

the shape of the concentrator is defined by a continuous contour situated in a plane perpendicular to the thrust axis and surrounding it;

on a major portion of the contour, namely at least 50% of the contour and preferably at least 75% of the contour, each section of the concentrator perpendicular to the contour has a parabolic shape and has a focus belonging to the contour; and the magnetic circuit is arranged so as to generate the magnetic field in the vicinity of the contour.

In a manner known per se, the cathode is placed downstream of the anode. In addition, the electrical circuit is arranged in such a manner that the electrical field is generated in a generally axial direction (that of the thrust axis) between the anode and the cathode.

Generally, downstream of the concentrator the channel also has a cylindrical, or substantially cylindrical rear portion. By "cylindrical" rear portion is meant here a rear portion of which the surface is generated by displacement, along one direction, of a closed contour; here, this direction is the thrust axis. The rear portion of the channel then serves to channel and direct the particles during their acceleration and their ejection by the thruster.

This rear portion generally extends directly from the downstream limit of the concentrator.

The channel generally has an annular shape; it therefore has an inner wall and an outer wall. In a preferred embodiment, the magnetic circuit comprises a plurality of connection arms arranged so as to connect the inner wall and the outer wall of the channel.

The fact that the contour surrounds the thrust axis (of course, as viewed along this axis), signifies that the contour is wrapped around this axis when viewed along the thrust axis.

Moreover, the term "voltage source" designates broadly, in this document, a device capable of generating a voltage. This voltage need not necessarily be constant or even periodic in time. Consequently, a current source configured to deliver a current of constant intensity constitutes a voltage source within the meaning of the present invention.

In one embodiment, the voltage source is controllable: it is configured so that the electrical voltage that it applies between the anode and the cathode(s) can be reversed on command. In the case of a reversal, the roles of the anode and of the cathode(s) in the electrical circuit are reversed.

This reversal allows the direction of the force applied by the thruster to be reversed, and to utilize it as a braking system, for example for braking a satellite during re-entry into the atmosphere.

On the other hand, a second aspect of the invention relates to a specific thruster configuration, in which the particles are accelerated not inside the canal previously indicated, in the core of the thruster, but rather outside it, around the wall. Despite this important difference, the principle of operation of the Hall-effect thruster nevertheless remains substantially identical to that of previous Hall-effect thrusters.

According to this second aspect of the invention, the objective of the invention previously indicated is attained by means of a Hall-effect thruster for developing thrust along a thrust axis, the thruster comprising:

a magnetic circuit for generating a magnetic field;

an electric circuit comprising an anode, a first cathode, and an electric voltage source for emitting electrons at least via the first cathode and attracting electrons via the anode;

the thruster being characterized in that the thruster is arranged inside a wall formed around the thrust axis;

the magnetic circuit and the electrical circuit are arranged so as to generate magnetic and electric fields around the wall; and in any section parallel to the thrust axis and perpendicular to the wall:

the magnetic circuit has an upstream magnetic pole and a downstream magnetic pole, disposed substantially at the surface of the wall at a distance from one another, and the magnetic circuit is arranged in such a manner that the magnetic field is oriented along a substantially radial (and thus perpendicular) direction with respect to the thrust axis in front of the upstream magnetic pole;

the anode and the first cathode are situated on either side of the upstream magnetic pole;

the wall includes a particle concentrator serving to concentrate particles;

the shape of the concentrator being defined by a closed contour (or curve) situated in a plane perpendicular to the thrust axis and surrounding the wall;

on a major portion of the contour, namely at least 50% of the contour and preferably at least 75% of the contour, each section of the concentrator perpendicular to the contour having a parabolic shape and having a focus belonging to the contour;

the magnetic circuit being arranged so as to generate the magnetic field in the vicinity of the contour.

The previously mentioned wall is usually the outer wall of the casing of the spacecraft on which the thruster is mounted.

Downstream of the concentrator, this wall can further comprise a cylindrical, or substantially cylindrical rear portion. This rear portion constitutes a shield serving to protect the rear of the satellite from ions ejected by the thruster and other incident particles.

The features previously mentioned whether in reference to the first or to the second aspect of the invention, advantageously allow the thruster to have a sufficient intake of particles, this even if the spacecraft is maneuvering at high altitude.

In fact, a good portion of the particles located on the trajectory of the spacecraft strike the concentrator. This has a specific shape with sections which have parabolic shape (that is the shape of a portion of a parabola).

Due to this shape, the particles which strike the wall of the concentrator are all directed substantially into the same zone, namely toward the focus of the parabola.

As a result, the concentrator allows all the particles that it collects to be concentrated in a rather reduced volume. It follows that in the vicinity of this point, the density of particles is increased and considerably exceeds the density of particles of the residual atmosphere.

It is thus possible to advantageously raise the density of particles in this zone to a value sufficient to feed the Hall-effect thruster (on the order of $10^{20}$ particles per $m^3$).

It is understood that it is appropriate to dimension the diameter, and more generally the dimensions of the wall of the concentrate so as to ensure that this particle density is actually attained, by taking into account the altitude and the speed at which it is intended to use the satellite. The particles concentrated in the vicinity of the focus of the parabola are used as the propellant gas of the thruster.

Due to the arrangement, particularly of its electrical circuit and of its magnetic circuit, the thruster is designed so as to generate a cathode grid formed of electrons blocked by the magnetic field at the point of, or at least in the vicinity of the focus of these parabolas.

The particles captured by the spacecraft are therefore directed by the concentrator toward the focus of the parabola and therefore toward the virtual cathode grid of the thruster. They are then ionized and are accelerated toward the rear of the thruster under the influence of the electric field generated between the anode and the cathode of the electrical circuit.

Thus, the arrangement of the thruster and in particular of its concentrator therefore allows the low density of particles at high altitude to be compensated, by concentrating the particles located on the trajectory of the satellite into a reduced zone, in which they can be accelerated so as to generate thrust for the spacecraft.

The thruster configured according to the second aspect of the invention can possibly include, as in the first aspect of the invention, a controllable voltage source of which the poles can be reversed to allow the use of the thruster as a braking system.

Whether according to the first or the second aspect, the invention can advantageously be implemented by integrating one or more of the following improvements: the contour from which the shape of the concentrator is defined can in particular be a circle, or an ellipse, or an oval; the anode can constitute a portion of the wall or of one of said walls; the anode can be formed as a hollow in the wall or in one of said walls.

Finally, the invention also relates to a spacecraft incorporating at least one Hall-effect thruster as previously defined.

For this reason, it relates in particular to a spacecraft incorporating at least one Hall-effect thruster according to the first aspect of the invention, the spacecraft being configured to carry a useful load disposed radially inside the inner wall of the channel of the thruster.

On one embodiment of such a spacecraft, the contour can be a circle, or an ellipse, or an oval.

In one embodiment of such a spacecraft, the anode can constitute a portion of one of the walls of the channel of the thruster.

BRIEF DESCRIPTION OF THE DRAWINGS

The invention will be well understood and its advantages will appear more clearly upon reading the detailed description that follows, of embodiments shown as non-limiting examples. The description refers to the appended figures in which.

DETAILED DESCRIPTION OF THE INVENTION

Two embodiments of the invention corresponding respectively to its first and to its second aspect will now be presented by means of two satellites, 1 and 101, respectively including a thruster 10 and a thruster 110, both conforming to the invention.

These satellites 1 and 101 are satellites intended to maneuver in the Earth's atmosphere while remaining between altitudes of 100 and 300 km.

Advantageously, this altitude is relatively low, which allows certain equipment (communication equipment, cameras, etc.) to have a relatively small size and therefore mass. Conversely, at this altitude the Earth's atmosphere offers a slight, but non-zero resistance to the passage of the satellite. It is therefore necessary to compensate for the induced drag.

The function of the Hall-effect thruster which each of these satellites includes is to supply thrust to the satellite, allowing it to be maintained in operation at the desired altitude.

It also allows providing for orbital changes or corrections.

Advantageously, a thruster according to the invention like those carried on board these satellites, coupled with means for supplying electrical energy such as solar panels, is capable of supplying over very long durations the necessary thrust for maintaining the satellite's altitude.

Figure 1:
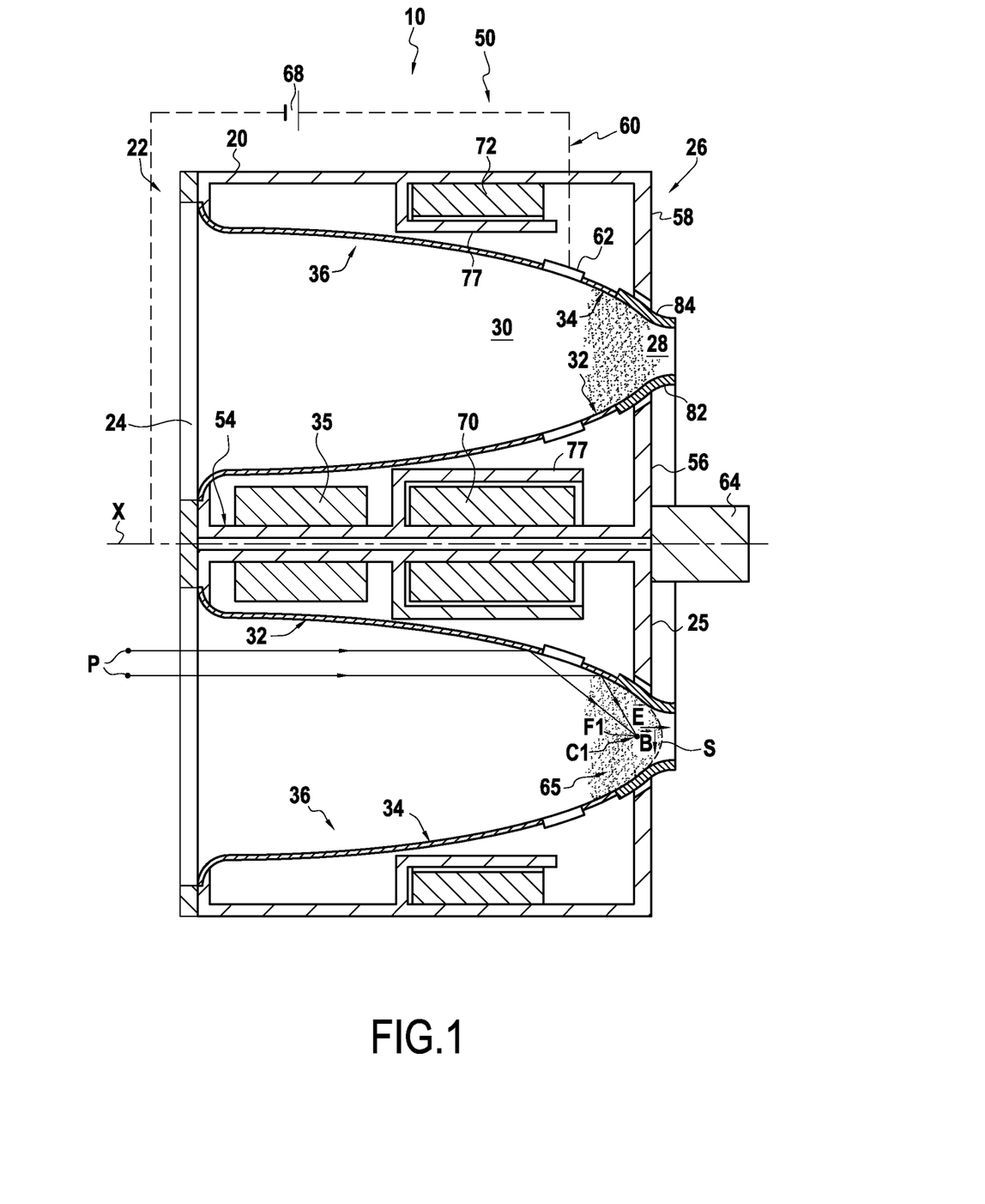
FIG. 1 is a longitudinal section of a thruster for a spacecraft, conforming the first aspect of the invention.
Figure 2:
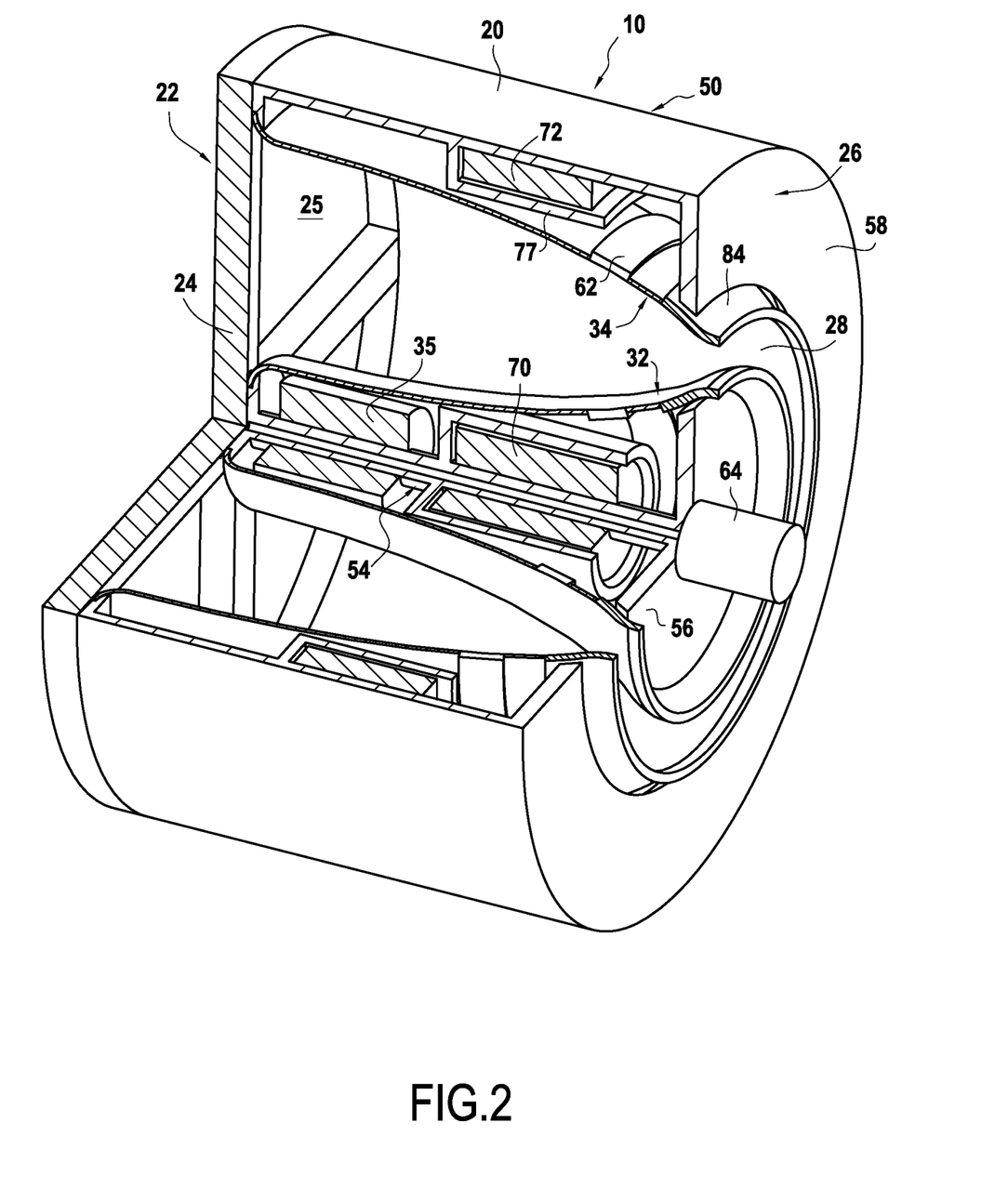
FIG. 2 is a perspective view of a satellite comprising the thruster of FIG. 1.

The first embodiment illustrates the first aspect of the invention in relation to FIGS. 1 and 2.

FIGS. 1 and 2 show the thruster 10 of the satellite 1 (an example of a spacecraft), which is a Hall-effect thruster with atmospheric gas as a propellant.

The thruster 10 has a rotationally symmetrical shape overall around a thrust axis X. It is arranged inside a casing 20 with a substantially cylindrical shape with axis X. The upstream end 22 of this casing is open while the other end 26 (downstream end) is partially closed by a substantially flat bottom 25 perpendicular to the axis X. The bottom 25 is crossed however, by an annular particle ejection passage 28.

The bottom 25 has the general shape of a disk perpendicular to the axis X. Due to the presence of the passage 28, the bottom 25 consists of a disk 56 and an annular area 58 situated radially around the annular passage 28. The annular area 58 is formed integrally with the rest of the casing 20.

Inside the casing 20, the thruster 10 includes a channel 30 with a generally annular shape around the axis X. More generally, this channel 30 can also be axisymmetric. However, non-axisymmetric shapes can also be alternatively considered for example with oval or racetrack-shaped cross-sections.

The channel 30 has a generally annular shape and comprises a radially outer wall 34 and a radially inner wall 32, which are concentric around the axis X.

The channel 30 essentially consists of a particle concentrator 36, which opens on the upstream side (on the left in FIG. 1) of the satellite and serves to collect particles located on the trajectory of the satellite.

On the downstream side, the concentrator 36 leads to the annular passage 28, which itself is open on the downstream side of the satellite 1 to allow the ejection of particles accelerated by the thruster 10.

In conformity with the invention, the shape of the concentrator 36 is defined by a continuous contour C1. In this embodiment, this contour C1 is a circle, situated in a plane perpendicular to the thrust axis. The circle C1 is centered on the axis X (and consequently surrounds this axis).

In any plane perpendicular to the circle C1 (that is, in this embodiment, in any meridian plane), the section of the concentrator is that which is shown in FIG. 1: it has a parabolic shape S, the focus f1 of which belongs to the circle C1 (only the portion of the parabola S serves to define the shape of the concentrator 36).

The circle C1 is positioned so as to be situated axially at the annular passage 28.

On the upstream side, the thruster 10 also includes connection arms 24 which provide a mechanical connection between the inner and outer walls 32 and 34 of the channel 30. Four openings 25 are formed between the arms 24 through which particles P penetrate into the channel 30.

The thruster 10 includes a magnetic circuit 50 and an electrical circuit 60.

The magnetic circuit 50 comprises: the casing 20 itself, which is made of a ferromagnetic material and thus forms an outer magnetic core; the bottoms 24 and 25, made of ferromagnetic materials; and a central magnetic core 54 in the form of a shaft, which extends along the axis X. The disk 56 which constitutes a portion of the bottom 25 forms the downstream end of the shaft 54.

All the elements of the magnetic circuit 50 previously mentioned are arranged so as to allow loss-free circulation of a magnetic field through the magnetic circuit.

To protect the downstream portion of the channel from wear and contain the electron cloud formed in the air gap of the magnetic circuit, the axially downstream portions of the walls 32 and 34 are formed by rings of ceramic material 82 and 84, positioned at the annular passage 28.

The magnetic circuit 50 further includes an inner annular coil 70 and an outer annular coil 72, which serve to generate the magnetic field B necessary to the operation of the Hall-effect thruster. These two coils are formed concentrically around the axis X. These are coils of substantially cylindrical shape, each of the turns of which is substantially a circle with axis X.

The coil 70 is formed around the shaft 54 (radially) inside the wall 32 (i.e. between the shaft 54 and the wall 32). The coil 72 is formed on the inner face of the cylindrical casing 20, and more precisely between this inner face and the outer wall 34 of the channel 30. The coils 70 and 72 are supplied by a source of electrical energy, not shown.

In the magnetic circuit 50, the central magnetic core 54 and the outer magnetic core (the casing 20) are disposed in such a manner that their polarities are opposite.

The circuit 50 is arranged so as to generate a substantially radial magnetic field B in the annular passage 28, which thus constitutes the air gap of the circuit 50. Thus, the downstream portion of the channel 30 passes or extends in the air gap 28 of the circuit 50.

In the channel 30, the intensity of the magnetic field B is a maximum at the (axial) level of the annular passage 28.

On the other hand, as previously indicated, the thruster 10 also comprises an electrical circuit 60.

This circuit comprises an anode 62 situated axially slightly upstream of the annular passage 28, a cathode 64 situated for the most part downstream of the end 26 of the channel 30 (and therefore downstream of the passage 28), and an electrical voltage source 68 connecting the anode 62 to the cathode 64.

In this embodiment, the voltage source 68 is controllable (although this is not shown in the figures): its electrical voltage can be reversed so as to reverse the thrust of the thruster.

The anode 62 forms a portion of the inner wall 34 of the channel 30: it is thus integrated into this channel, while still being electrically insulated from it (and particularly from the wall 34).

In the vicinity of the anode 62, the magnetic field B generated by the magnetic circuit 50 is attenuated by inner and outer magnetic screens 77 formed respectively on the inner surface of the casing 20 and on the outer surface of the shaft 54. These screens 77 also serve to mechanically support the coils 70 and 72.

The cathode 64 is situated outside the open downstream end of the annular channel 28. In the embodiment of FIGS. 1 and 2, it is attached to the disk 56, on the exterior side, i.e. downstream of the shaft 54. In FIG. 2, the cathode 64 is shown by dotted lines.

In another embodiment, the cathode 64 can be attached, not to the disk 56 but rather to the exterior surface (on the downstream or rear side) of the annular area 58. The cathode can then have in particular an annular shape, and not the shape of a stud as shown in FIG. 2.

The cathode 64 is connected to the electrical voltage source 66 by a cable circulating inside the inner wall 32 of the channel 30, and more precisely inside the shaft 54.

In the embodiment of FIGS. 1 and 2, the volume available inside (radially) of the wall 32 is equipped to accommodate a useful load 35 of the satellite 1.

This is disposed radially inside the inner wall 32, as illustrated in FIGS. 1 and 2.

In another embodiment, the thruster can be designed specifically with a much larger interior volume inside the wall 32. A large portion, even the totality of the useful load can then be disposed in this volume, inside the inner wall 32 of the channel 30 of the thruster.

In this case, the thruster is arranged in practice in the form of an annular structure disposed around the useful load of the satellite, or more generally of the spacecraft.

The operation of the thruster 10 will now be described. This operation is identical overall to that of the thruster described by document US2003/0046921 A1.

When the satellite 1 is moving at high speed in the atmosphere, the particles located on its trajectory are captured by the concentrator 36 and penetrate into it.

As FIG. 1 shows, when a particle P thus penetrates into the concentrator 36, it strikes most often one of the walls 32 or 34 of it.

Now, it has been observed that the particles bounce in a quasi-specular manner on the walls of satellites or spacecraft. In other words, the impacts between a particle and a wall of the satellite seem to occur without friction, i.e. the angle of incidence and the angle of ejection of the particle with respect to the wall are equal.

Consequently, as a result of this impact and due to the properties of the focus of a parabola, a particle P which strikes a wall 32 or 34 of the concentrator 36 is sent back to the focus F1, that is toward a point of the circle C1.

Thus, the concentrator allows the particles captured by the satellite 1 to be advantageously directed into a rather reduced zone situated in the vicinity of the circle C1.

The circle C1 is positioned so as to be situated at the point where the magnetic field B generated by the magnetic circuit is at its most intense, that is at the annular passage 28.

Simultaneously in addition, an electrical voltage, typically on the order of 150 to 800 V, is established between the cathode 64 downstream of the downstream end of the channel 30, and the anode 62. The cathode 64 therefore emits electrons, which are largely trapped in a "magnetic enclosure" formed by the magnetic field B. This magnetic enclosure is suitable to the performance desired and is typically on the order of 100 to 300 gauss. The electrons trapped in this magnetic enclosure thus form a virtual cathode grid 65, thus substantially forming a ring along the circle C1 inside the channel 30.

An electric field E is thus generated in the channel 30, at the annular passage 28 (FIG. 1) and upstream of it to the anode 62, and particularly at the virtual cathode grid 65.

However, a small portion of the electrons thus captured, namely those which are most energetic (typically 10 to 40 eV), escape from the magnetic enclosure and reach the anode 62.

As was indicated previously, the particles P which are captured by the satellite 1 are concentrated by the concentrator 36 in the vicinity of the circle C1. They therefore enter the virtual cathode grid 65 formed by the electrons trapped by the magnetic field B.

The impacts between these electrons and the particles P ionize them. Due to their electrical charge, the ionized particles are then accelerated toward the downstream end 26 of the channel 30 by the electric field E. As the mass of the ionized particles is several orders of magnitude greater than that of the electrons, the magnetic field does not confine these ions as it does the electrons. The thruster 10 thus generates a plasma jet which is ejected at an extremely high speed through the downstream end of the channel 30. The thruster 10 therefore produces a thrust, substantially aligned with the central axis X.

Figure 3:
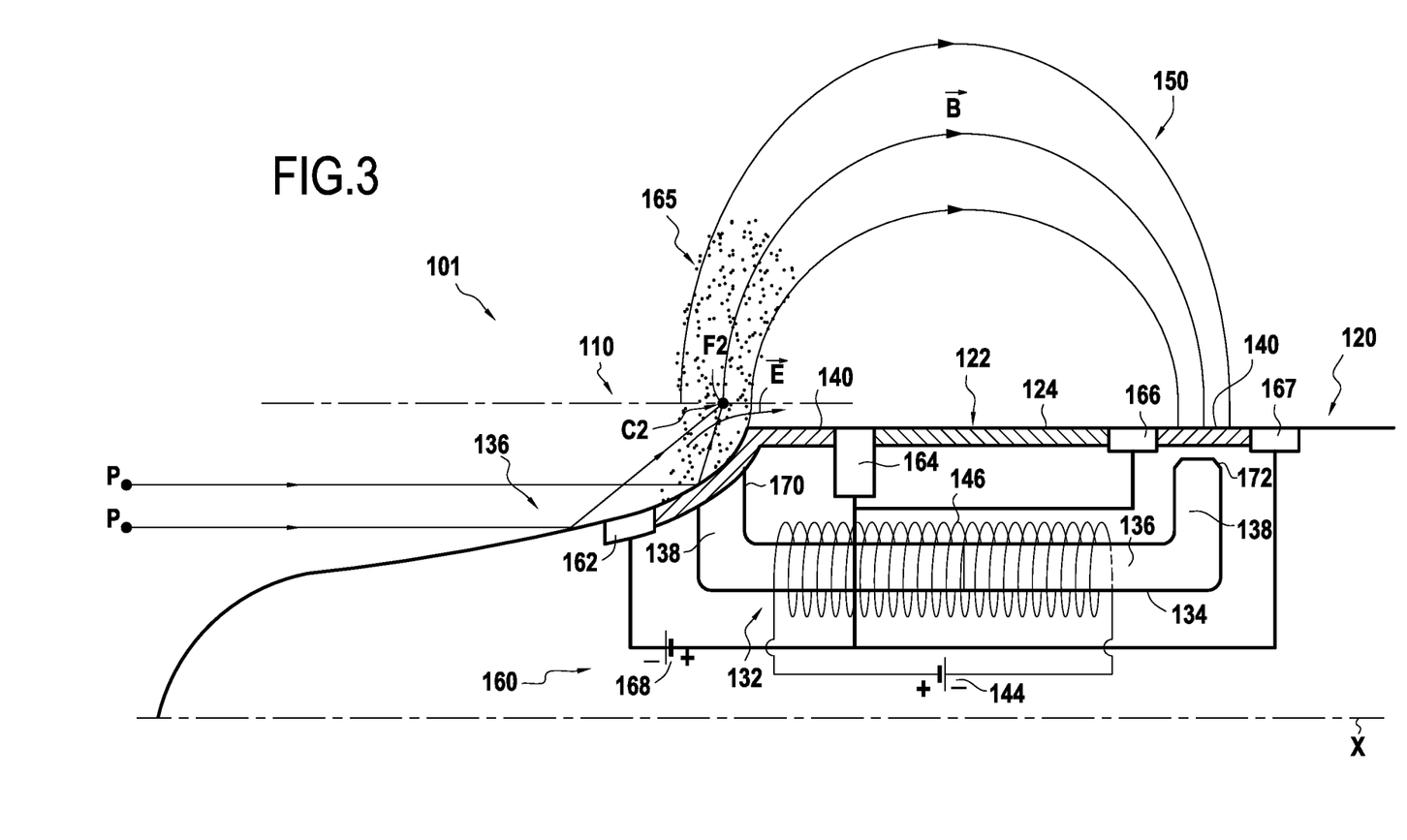
FIG. 3 is a longitudinal section of a spacecraft comprising a thruster conforming to the second aspect of the invention.
Figure 4:
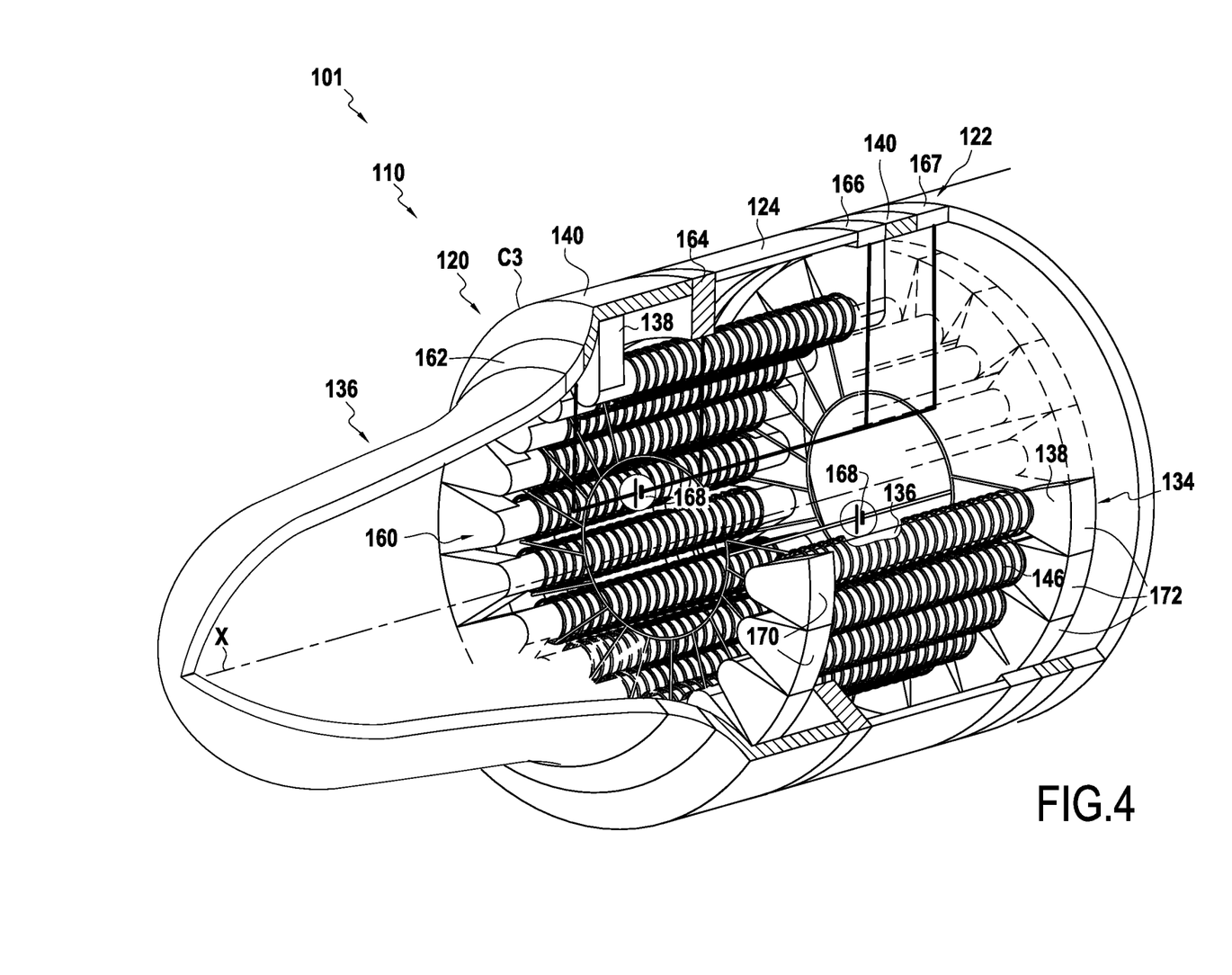
FIG. 4 is a perspective view of the satellite of FIG. 3.

The second embodiment, which illustrates the second aspect of the invention, will now be presented in relation with FIGS. 3 and 4.

FIG. 3 represents a satellite 101, including a Hall-effect thruster 110 according to the invention.

The satellite 101 is arranged in an exterior casing 120 which has a rotationally symmetrical shape around an axis X. The thruster 110 is arranged inside the outer wall 122 of the casing 120.

The thruster 110 has an axisymmetric structure around the axis X. The terms "upstream" and "downstream," in the present context, are defined with respect to the normal direction of circulation of the satellite and therefore of the thruster.

The wall 122 has two portions, namely a particle concentrator 136, which serves to concentrate the particles P located on the trajectory of the satellite 101 or in the vicinity of it, and a rear portion 124 situated downstream of the concentrator 136.

The shape of the concentrator 136 is defined by a continuous contour C2. As in the preceding embodiment, the contour C2 is a circle. It is situated in a plane perpendicular to the thrust axis X and is wrapped around the wall 120.

In section in any plane perpendicular to the contour C2, the concentrator 122 has a parabolic shape with a focus F2 belonging to the contour C2.

The concentrator 136 and the rear portion 124 converge at an edge forming a circle C3 (FIG. 4).

The rear portion 124 of the wall 120 has a cylindrical shape with axis X; its shape is that generated by the displacement of the circle C3 toward the rear in the direction of the axis X.

The thruster 110 includes a magnetic circuit 150 and an electrical circuit 160.

The magnetic circuit 150 is arranged so as to create a substantially radial magnetic field at the level (axially, with reference to the axis X) of the upstream portion of the wall 122.

For this purpose, it includes a plurality of identical elementary magnetic circuits 132, distributed axisymmetrically around the axis X.

Each circuit 132 comprises an iron core 134 which, in axial section, has a U shape. The core 134 includes a long rod 136 which extends parallel to the axis X in proximity to the wall 122 (and inside it). It also includes two bent segments 138 which are bent in a radial plane toward the wall 122, in such a manner that the end of these segments is disposed just below the surface of the wall 122. With regard to these segments 138, the casing 120 includes rings 140 of non-magnetic material so as to allow the passage of the magnetic field. The rings 140 can for instance be made of ceramics, of polycrystalline cubic carbon (that is of diamond), or of alumina.

Each circuit 132 also includes a coil 146 forming a solenoid arranged around the rod 136.

The terminals of the coils 146 of the circuits 132 are connected to those of a voltage source 144. This voltage source is selected in such a manner that, under the influence of the voltage applied to the coils 146, a stable magnetic field B can be created around the wall. A current source can also be used.

As a result, when a voltage is applied by the voltage source 144 to the coils 146, each magnetic circuit 132 generates a magnetic field B. This field is radiated by the circuit 132 outside the satellite 101 in the space in the vicinity of the satellite. The field lines formed are shown in FIG. 3. As shown by this figure, the ends of the bent segments 138 therefore form magnetic poles for the circuits 132, namely an upstream magnetic pole 170 and a downstream magnetic pole 172.

In front of (or facing) an upstream magnetic pole 170, the magnetic field B is oriented in a substantially radial direction with respect to the thrust axis (X) (i.e. perpendicular to this axis and passing through it).

As can be seen in FIG. 4, the upstream magnetic poles 170 of two adjacent elementary magnetic circuits 132 are formed so as to be close to one another, or even be in contact if possible. The same is true for the downstream magnetic poles 172. This allows the magnetic circuit to have an upstream magnetic pole and a downstream magnetic pole in any axial plane, which generate the magnetic field B. Thanks to this, the magnetic field B is generated substantially uniformly over the entire periphery of the wall 122.

The upstream magnetic poles 170 are formed at the level (axially) of the contour C2. Thus, the magnetic circuit 150 is arranged in such a manner that the magnetic field B generated in front of the upstream magnetic pole is generated in the vicinity of the contour C2.

The thruster 110 also comprises an electric circuit 160. This circuit comprises an anode 162, a first cathode 164, a second cathode 166, a third cathode 167 and an electrical voltage source 168 connecting the anode 162 to the first, the second and the third cathodes 164, 166, 167. The anode 162 is situated axially upstream of the upstream magnetic pole 170. The first cathode 64 is situated downstream of the upstream magnetic pole 170 but immediately in the vicinity of it and therefore at a certain distance upstream of the downstream magnetic pole 172.

The second cathode 166 is situated between the upstream magnetic pole 170 and the downstream magnetic pole 172. It is therefore downstream of the upstream magnetic pole 170, and upstream of the downstream magnetic pole 172.

The third cathode 167 is situated downstream of the downstream magnetic pole 172.

Moreover, each of the cathodes 166 and 167 is situated in proximity to the downstream magnetic pole 172, and therefore at a certain distance downstream of the first cathode 164.

The anode 162, as well as the first, second and third cathodes 164, 166, 167 each have the shape of a ring. Each of these rings extends over the entire circumference of the wall 122, in a plane perpendicular to the axis X overall (or more precisely, between two close planes perpendicular to the axis X). Each of these cathodes is flush with the surface of the wall 122 and thus constitutes a portion of this wall.

The thruster 110 operates in a manner analogous to the thruster 10.

As with the voltage source 68 in the preceding embodiment, the voltage source 168 is controllable: its electrical voltage can be reversed so as to reverse the thrust of the thruster.

Depending on the direction given to the voltage by the voltage source 168, the force generated by the thruster 110 can be in one direction or in the other, along the direction X; depending on the case, the thruster therefore acts either as a drive system, or as a braking system.

The mode of operation of the thruster described here is the drive mode:

When a voltage is applied by the voltage source 168 between the anode 162 and the cathodes 164, 166 and 167, an electrical field E is formed in the space exterior to the satellite around the wall 122, essentially between the anode 162 and the first cathode 164. This field is oriented substantially along a direction parallel to the axis X.

Moreover, under the influence of the electrical voltage established between the downstream cathodes and the upstream anode 162, the cathodes 164, 166 and 167 begin to emit electrons. A large portion of these are trapped in a magnetic enclosure formed by the magnetic field created by the magnetic circuit 150, suitable for the desired performance, and which can typically be on the order of 100 to 300 gauss. The electrons trapped in this magnetic enclosure will thus form a virtual magnetic grid 165. However, certain highly energetic electrons (typically 10 to 40 eV) escape the magnetic enclosure and reach the anode 62.

Due to the relative displacement of the satellite 101 with respect to the atmosphere, at every instant, particles penetrate into the virtual cathode grid 165. The impacts between the electrons held in this grid and the atoms of these particles cause their ionization. The ionized particles, under the influence of the electric field E created by the electrical circuit 160, are then accelerated toward the rear of the satellite. The thruster 110 therefore generates a plasma jet which is ejected at an extremely high speed in the direction X, toward the rear of the satellite, downstream of the wall 122. For reasons of symmetry, the thrust generated is substantially aligned with the central axis X.

When the thruster 110 is operating, the second and the third cathode 155 and 167 supply electrons to the particles liberated downstream of the satellite 100, and thus ensure their electrical neutrality.

The use of the second cathode 166 is optional. It is mainly the third cathode 67, situated downstream of the downstream magnetic pole 52, which supplies the electrons necessary for the neutralization of the particles accelerated by the thruster 10.

Advantageously, the thruster according to the invention does not require a supply of propellant gas, contrary to most Hall-effect thrusters.

Moreover, its arrangement on the outside wall of the satellite frees a large portion of the interior space of the satellite, which allows a large useful load to be disposed there.

It will also be noted that the electric field E generated by the electric circuit 160 is extremely weak in the vicinity of the downstream magnetic pole 172. As a result, the force generated by the thruster 110 is created in the vicinity of the upstream magnetic pole 170; in the absence of the electric field E in the vicinity of the downstream magnetic pole 172, essentially no reverse force is generated in the vicinity of the latter pole.

Advantageously, according to the invention, it is not necessary for the concentrator to direct the particles that it concentrates precisely toward the focus of the parabola defined by its wall (in the case of the thruster 10) or by its walls (in the case of the thruster 110). As a virtual cathode grid is formed in a certain volume surrounding this focus, it is sufficient that the particles captured by the concentrator be directed inside this volume. This gives a certain tolerance as regards the shape of the wall(s) to the concentrator.

The invention claimed is:

1. A Hall-effect thruster for developing thrust along a thrust axis, the Hall-Effect thruster comprising: a channel allowing collection, acceleration and ejection of particles by the Hall-Effect thruster when the Hall-Effect thruster is in operation, the channel being delimited radially by an inner wall and an outer wall; an electric circuit comprising an anode, a cathode and an electrical voltage source to emit electrons via the cathode and to attract the electrons via the anode; a magnetic circuit for generating a magnetic field in the channel axially downstream of the anode, the magnetic field being directed in a substantially radial direction with respect to the thrust axis; wherein the channel is open on an upstream side of the Hall-Effect thruster and comprises a particle concentrator for collecting the particles; wherein a shape of the concentrator is defined by a continuous contour situated in a plane perpendicular to the thrust axis and surrounding the thrust axis; wherein on a majority of the continuous contour, each section of the concentrator perpendicular to the continuous contour has a parabolic shape having a focus belonging to the contour; and the magnetic circuit is arranged so as to generate the magnetic field in a vicinity of the contour, such that a virtual cathode grid is formed surrounding the focus.

2. The Hall-Effect thruster according to claim 1, wherein the magnetic circuit comprises a plurality of connection arms arranged so as to connect the inner wall and the outer wall of the channel, the channel having an annular shape.

3. A Hall-effect thruster for developing a thrust along a thrust axis, the Hall-Effect thruster including: a magnetic circuit for generating a magnetic field; an electrical circuit comprising an anode, a first cathode, and an electrical voltage source for emitting electrons at least via the first cathode and attracting electrons via the anode; wherein the Hall-Effect thruster is arranged inside a wall formed around the thrust axis; wherein the magnetic circuit and the electric circuit are arranged so as to generate magnetic and electric fields around the wall; and wherein in any section parallel to the thrust axis and perpendicular to the wall: the magnetic circuit has an upstream magnetic pole and a downstream magnetic pole, disposed substantially at the surface of the wall at a distance from one another, and wherein the magnetic circuit is arranged in such a manner that the magnetic field is oriented along a substantially radial direction with respect to the thrust axis in front of the upstream magnetic pole; wherein the anode and the first cathode are situated on either side of the upstream magnetic pole; and in that: the wall includes a particle concentrator serving to concentrate particles; the shape of the concentrator being defined by a closed contour situated in a plane perpendicular to the thrust axis and surrounding the wall; wherein on a majority of the contour, each section of the concentrator perpendicular to the contour has a parabolic shape having a focus belonging to the contour; wherein the magnetic circuit is arranged so as to generate the magnetic field in the vicinity of the contour, such that a virtual cathode grid is formed surrounding the focus.

4. The Hall-Effect thruster according to claim 1, wherein said contour is a circle, or an ellipse, or an oval.

5. The Hall-Effect thruster according to claim 1, wherein the anode constitutes a portion of one of said inner wall and said outer wall.

6. The Hall-Effect thruster according to claim 1, wherein the anode is formed as a hollow in one of said inner wall and said outer wall.

7. A spacecraft incorporating at least one Hall-effect thruster according to claim 1.

8. A spacecraft incorporating at least one Hall-effect thruster according to claim 1, the spacecraft being configured to carry a useful load disposed radially inside the inner wall of the channel.

9. The spacecraft according to claim 8, wherein said contour is a circle, or an ellipse, or an oval.

10. The spacecraft according to claim 8, wherein the anode constitutes a portion of one of said inner wall and said outer wall.

11. The spacecraft according to claim 9, wherein the anode constitutes a portion of one of said inner wall and said outer wall.

12. The Hall-Effect thruster according to claim 3, wherein said contour is a circle, or an ellipse, or an oval.

13. The Hall-Effect thruster according to claim 3, wherein the anode constitutes a portion of the wall.

14. The Hall-Effect thruster according to claim 3, wherein the anode is formed as a hollow in the wall.

15. A spacecraft incorporating at least one Hall-effect thruster according to claim 3.

* * * * *